Patented Nov. 29, 1949

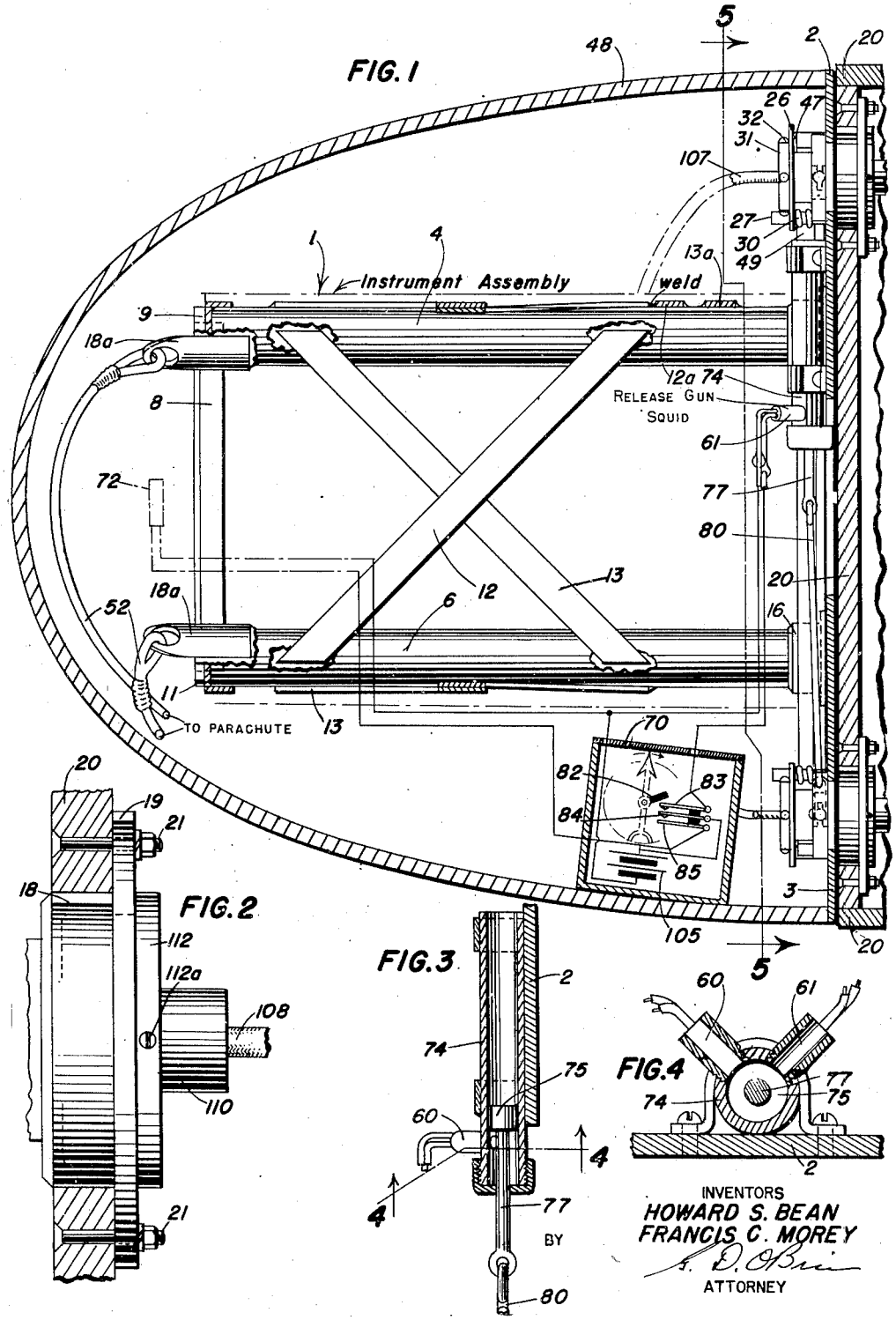

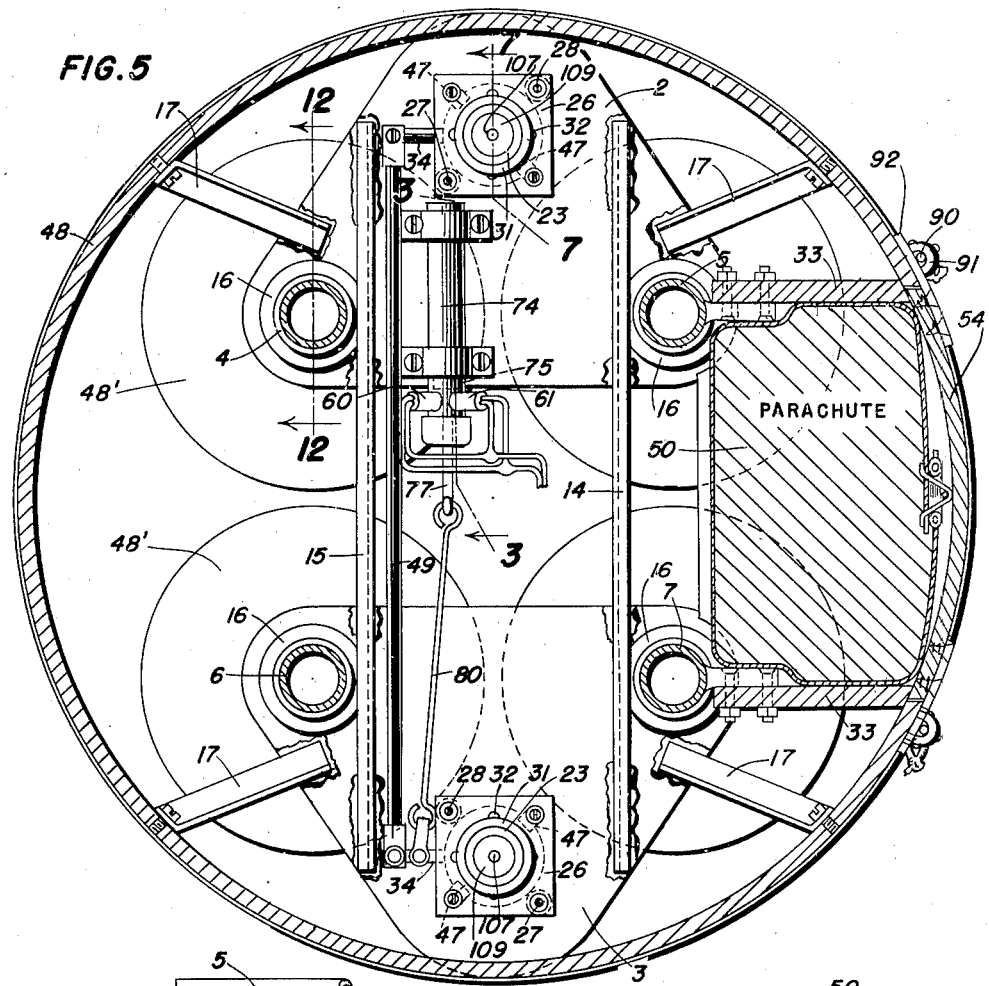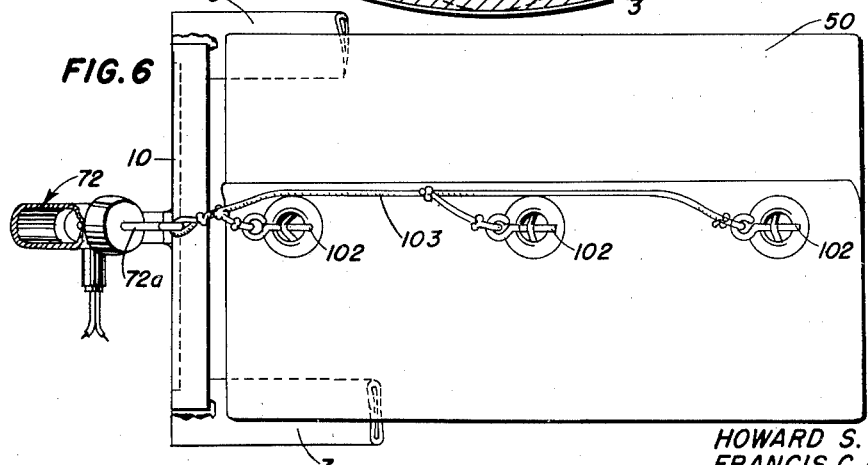

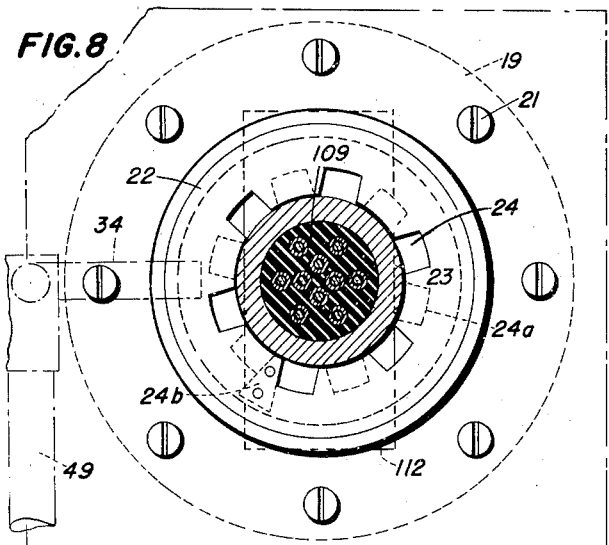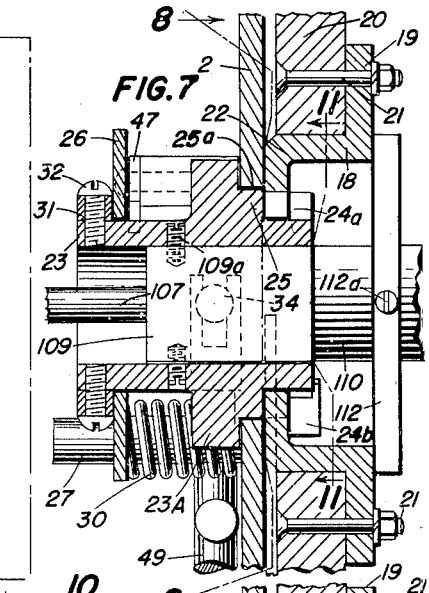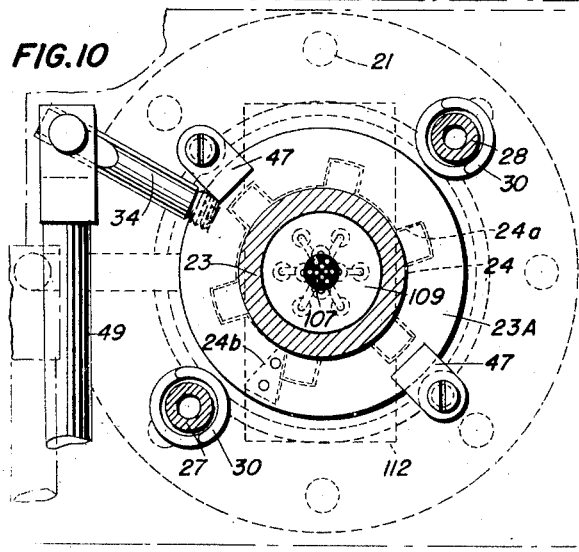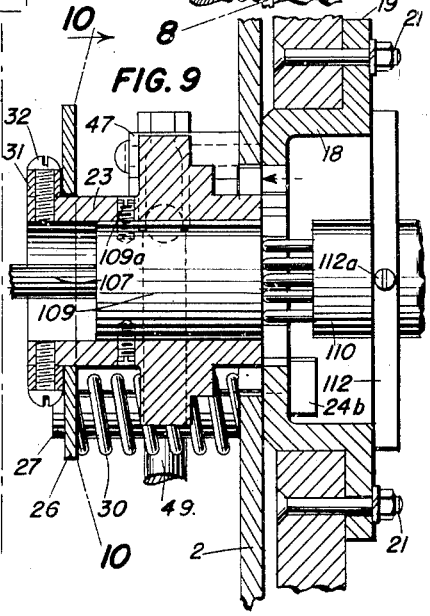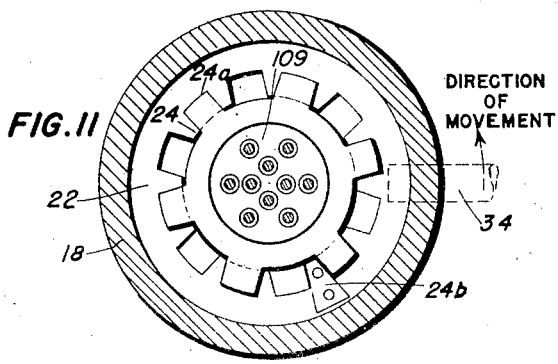

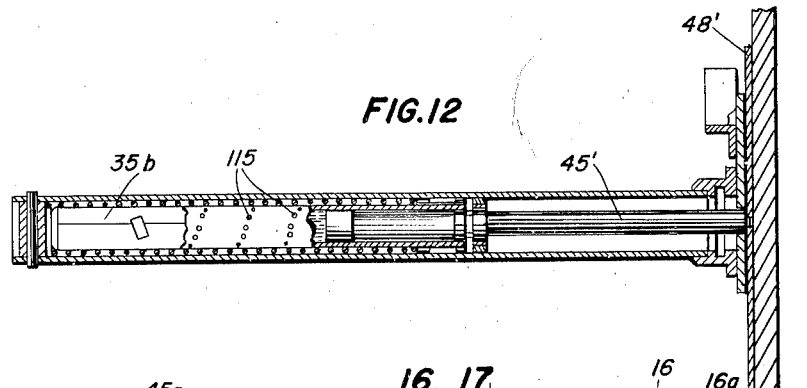
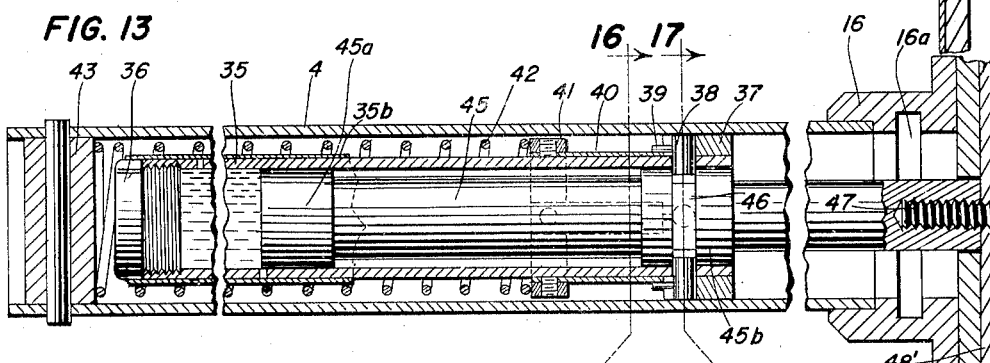
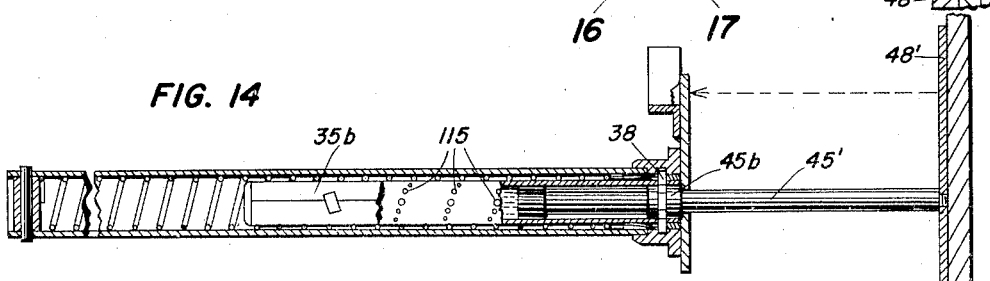
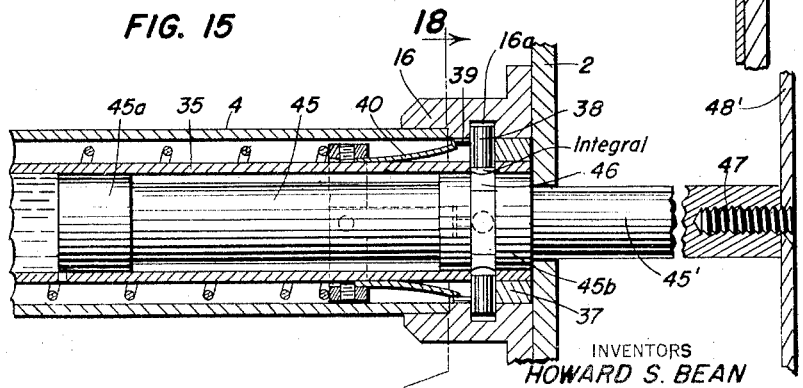

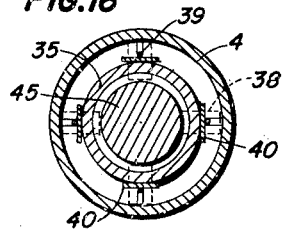
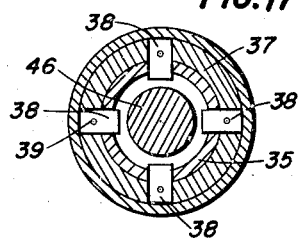
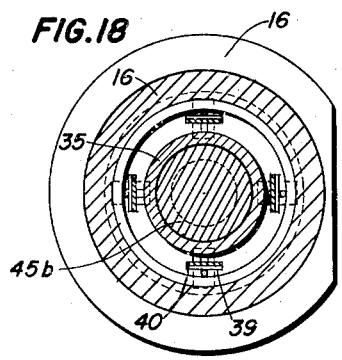
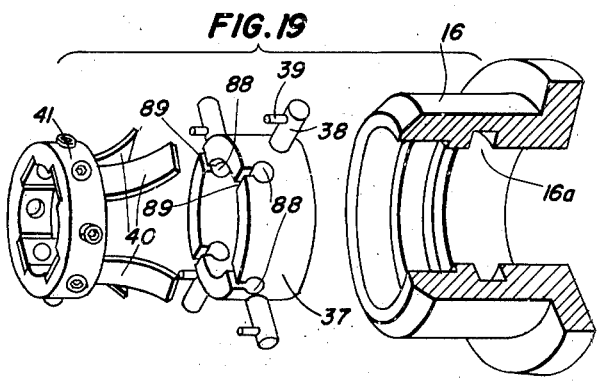
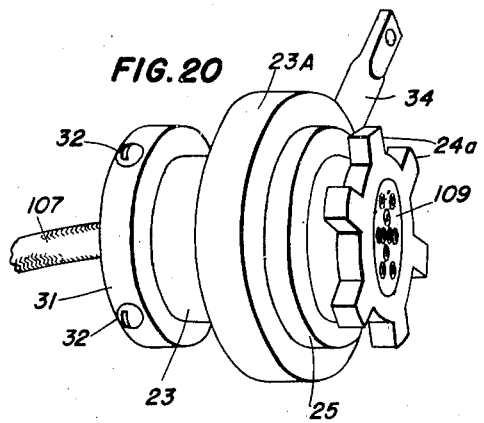
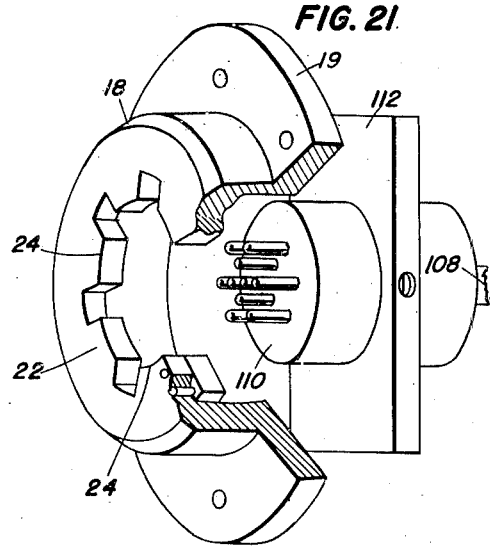

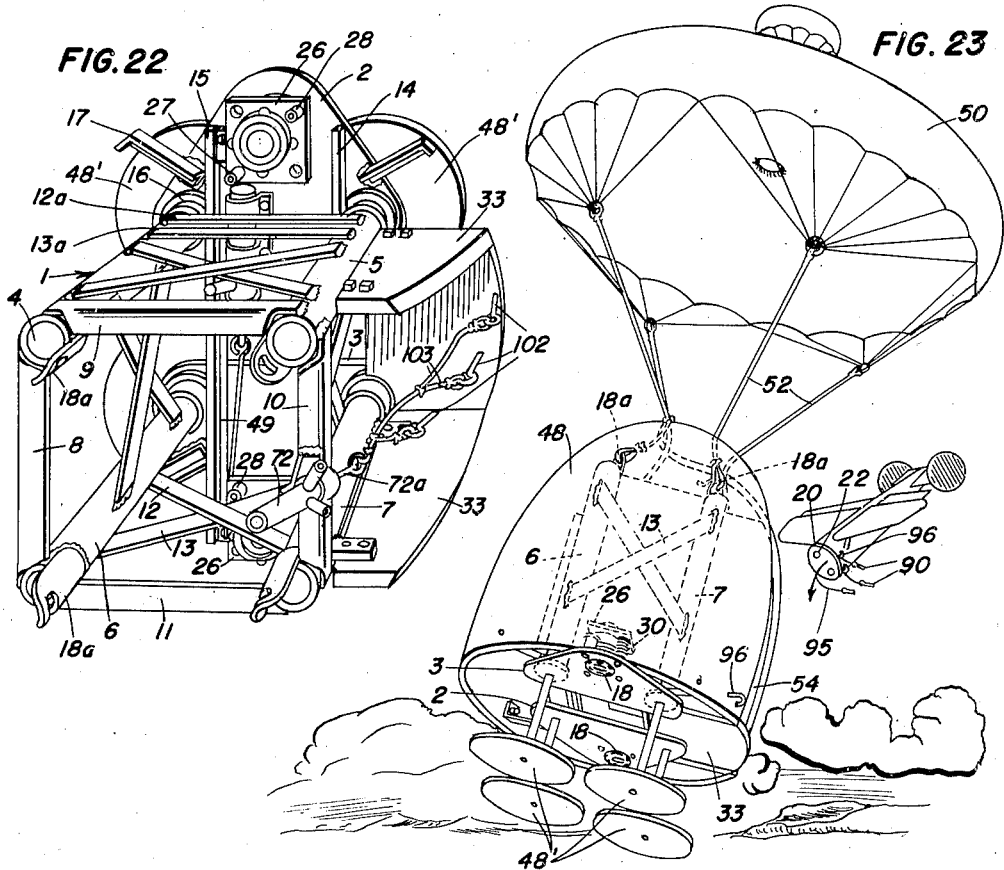
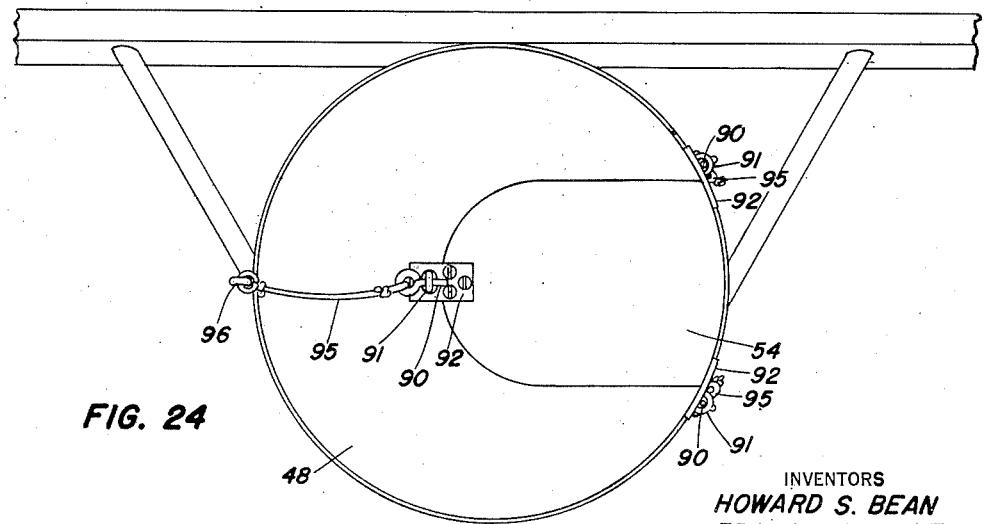

2,489,257

UNITED STATES PATENT OFFICE 2,489,257

CONTROL SYSTEM AND LANDING GEAR FOR AIRBORNE COMPONENTS

Howard S. Bean and Francis C. Morey, Kensington, Md., assignors to the United States of America as represented by the Secretary of the Navy Application August 1, 1946, Serial No. 687,544

12 Claims. (Cl. 244—138)

(Granted under the act of March 3, 1883, as amended April 30, 1928; 370 O. G. 757)

This invention relates to landing gear, particularly for cushioning the landing of parachute-borne aircraft components or cargoes.

It is an object of the invention to provide a rugged landing gear for the purpose stated in which the shock absorbing mechanism forms an internal part of the aircraft components to be landed, and the entire mechanism is enclosed within the fuselage out of the airstream while the aircraft is in flight.

Another object is the provision of a landing gear of the type described which includes a plurality of simultaneously operable shock absorbing elements.

Another object of the invention is to provide a landing gear so designed as to give a predetermined deceleration to a given load in a single action of the shock absorbing elements.

In the testing of remote-controlled gliders it is desirable that provision be made for the safe landing of the control equipment used in guiding the flight of the glider. In the case of small gliders it is feasible to provide a parachute and hydraulic landing gear for the entire glider, but for larger bomb-carrying gliders this is impractical due to their weight, hence separable fuselage construction has been resorted to, the main fuselage including the wings and the pay-load or bomb and a bodily separable portion of the fuselage carrying the instruments. A barometrically actuated mechanism releases the instrument-carrying portion of the fuselage from the main fuselage at a pre-set altitude. It is the principal object of this invention to provide an improved landing gear for the parachute-borne instrument-carrying fuselage.

In the drawings:

Fig. 1 is a vertical longitudinal sectional view of the forward portion of the nose of a glider equipped with landing gear constructed in accordance with the present invention, certain parts being shown in elevation.

Fig. 2 is a detail sectional elevation of a part of the landing gear, showing separable electrical connections employed to convey power between the nose and other portions of the fuselage.

Fig. 3 is a longitudinal section of the nose release gun, taken substantially on the line 3—3 of Fig. 5 and looking in the direction of the arrows.

Fig. 4 is a cross section taken substantially on the line 4—4 of Fig. 3 and looking in the direction of the arrows.

Fig. 5 is a vertical section taken substantially on the line 5—5 of Fig. 1 and looking in the direction of the arrows.

Fig. 6 is a plan view of the parachute pack, parts being broken away and shown in section.

Fig. 7 is a vertical section taken substantially on the line 7—7 of Fig. 5 and looking in the direction of the arrows, showing the parts in the positions they occupy when the nose is latched to the bulkhead.

Fig. 8 is a cross sectional view taken substantially on the line 8—8 of Fig. 7 and looking in the direction of the arrows.

Fig. 9 is a vertical sectional view similar to Fig. 7 but showing the latching parts in the released position.

Fig. 10 is a view similar to Fig. 8, corresponding to a section taken substantially on the line 10—10 of Fig. 9 and looking in the direction of the arrows, the parts being shown in released positions.

Fig. 11 is a detail elevational view taken substantially on the line 11—11 of Fig. 7 and looking in the direction of the arrows.

Fig. 12 is a longitudinal sectional view taken substantially on the line 12—12 of Fig. 5 and looking in the direction of the arrows, illustrating one of the shock absorber tubes with the parts in their initially retracted positioning, certain parts being shown in elevation.

Fig. 13 is a view similar to Fig. 12 but on a larger scale and centrally broken away, certain additional parts being shown in elevation.

Fig. 14 is a longitudinal sectional view corresponding to Fig. 12 but showing the parts in their extended positioning.

Fig. 15 is an enlarged fragmentary sectional view corresponding to Fig. 13 but showing the parts in their extended positions.

Fig. 16 and Fig. 17 are cross sectional views taken substantially on the lines 16—16 and 17—17 respectively of Fig. 13, and looking in the direction of the arrows.

Fig. 18 is a cross section taken substantially on the line 18—18 of Fig. 15.

Fig. 19 is an exploded perspective view, with parts broken away and shown in section.

Fig. 20 is a perspective view of the latching cylinder.

Fig. 21 is a perspective view of the latching socket, partly broken away.

Fig. 22 is a perspective view of the frame assembly, showing the bracing between the shock absorber posts and the parachute compartment.

Fig. 23 is a perspective view of the nose assembly released from the fuselage and in descent, supported by the parachute, the descent of the remainder of the fuselage also being illustrated.

Fig. 24 is a front elevational view of the glider with the nose in position and the parachute hatch locked in place, the wing being shown fragmentarily.

Referring now to the drawing, a structural frame work is generally indicated at 1, comprising a pair of coplanar main supporting and attachment plates 2, 3 of substantially triangular shape from which parallel tubular members or posts 4, 5, 6 and 7 project perpendicularly in parallel arrangement to define the corners of a rectangular enclosure. Two posts are attached to each plate, the posts being connected at their opposite ends by the structural members 8, 9, 10 and 11 and intermediately by diagonal straps 12, 13 welded thereto. Parallel channeled braces 14, 15 are employed to connect the triangular plates 2, 3, and straps 12a and 13a welded to opposing pairs of tubular members 4, 6, and 5, 7 provide additional cross bracing. Tubular members 4, 5, 6 and 7 are attached to the plates 2 and 3 by means of flanged collars 16 which may be welded to the plates. An annular groove 16a is formed interiorly of each collar portion as shown in Figs. 13 and 19. The framework described provides a rigid support for remote control equipment (not shown) or other desired cargo mounted in the nose of the glider fuselage. The framework also supports the nose skin or sheathing 48, which is shaped to substantially paraboloidal form and attached to brackets 17 welded to the triangular plates 2 and 3, as shown in Fig. 5. Eyes 18a are welded to the outer ends of the tubular members 4, 5, 6, and 7 for the attachment of the shroud lines of a parachute.

The frame assembly is normally mounted upon and forms the forward part or "nose" of the glider fuselage, although it is separable from the remainder of the fuselage by mechanism now to be described.

The general manner in which the nose section is attached to the forward bulkhead 20 of the main portion of the fuselage is clearly shown in Fig. 1. Figs. 7 to 11 inclusive show details of the latching means. Two points of attachment are provided by the two sockets 18, each socket having an outer flanged portion 19 secured to the bulkhead 20 by means of bolts 21 and having an inwardly directed flange 22 centrally provided with an aperture formed with a plurality of keyways forming equally spaced sector-shaped teeth 24 on the inner periphery thereof. A hollow latching cylinder 23 having a series of teeth 24a corresponding to the slots between the teeth 24 is loosely journaled at its shouldered portion 25 in a circular opening 25a in each of the main plates 2, 3. The latching cylinders are adapted to be inserted and interlocked by turning them with respect to the sockets in the manner shown in Figs. 7 and 8. Since a flange 23a of the latching cylinder lies behind the main plate, the interlocking of the cylinders with the sockets serves to fasten the main plates, and accordingly the entire nose structure to the bulkhead. A centrally apertured retracing collar 26 tends to pull the latching cylinder free when its teeth are not interlocked with those of the socket. Collar 26 is preferably square in shape comprising a plate slidably mounted on but held against rotation by pins 27 and 28, which are secured to the main plate. Compression coil springs as 30 surrounding each of the pins 27, 28, bear against the retracting collar of each such assembly, urging the collars to the left, as viewed in Figs. 7 and 9. A retaining ring 31 secured by screws 32 to the end of latching cylinder 23 prevents dislodgment of the collar.

Two retraction stops 47, one on each side of the central aperture and proximate the flange portion 23A of the cylinder 23 are attached to the plate 2 and provided with ears which overlie the flange portion 23A of the cylinder to limit outward movement of the cylinder (in a left-hand direction as viewed in Figs. 7 and 9). A sector shaped rotation stop 24b is mounted on the latching socket 18 adjacent one of the teeth thereof to prevent rotation of the latching cylinder beyond its effective latching and released positions. To turn the locking cylinder, flange 23A is bored and tapped to receive a short crank 34 threaded thereinto.

The two latching mechanism, one carried by each of the plates 2, 3, may be identical. A link 49 connects the ends of the cranks 34 of the two mechanisms, to insure simultaneous unlatching movement of both cylinders 23. When these parts are unlatched, the entire nose section, including the instrument frame assembly 1, is freed from the main glider fuselage.

In order to turn the two locking cylinders 23 to released position, to free the nose section from the remainder of the fuselage, a link 80 is connected to one of the crank arms 34, as best shown in Fig. 5 and connected to the stem 77 of a squib-operated piston 75 (Figs. 3, 4 and 5). Piston 75 is mounted in a cylinder 74 attached to plate 2, and is drivable in such direction as to turn the locking cylinders to released position, through the agency of links 80, 49, when squibs 60, 61, mounted in chamber attached to and opening into cylinder 74, are fired. The squibs are fired at a desired time and under desired conditions, to release the nose, by controlling means presently to be described.

An encased parachute 50 is attached, by means of the shroud lines 52, to the eyelets 18a, the entire parachute, together with the attached cords, being folded within the nose beside the frame assembly, being protected on the top, bottom and rear by a box-like enclosure 33 which is open at its side and of the same width as the adjacent elongated hatch 54 provided in the sheathing. The hatch extends along the full length of the side of the nose and part way across the front. Releasable retaining means is provided for the hatch, and the space allotted to the parachute is smaller than its relaxed size. The parachute thus tends to spring the hatch free when the retaining means is released.

The hatch retaining means is automatically released when the nose is freed from the remainder of the fuselage. The retention and automatic release of the hatch is simply effected by means of retaining pins 90 which project through simple hasps 91 attached to the sheathing beside the hatchway and extending outwardly through slots in hasp plates 92 attached to the hatch. Staples may be used for the hasps, as shown. Attached to each pin is a static line 95 which is led aft along the nose to the main fuselage and there made fast, as indicated at 96. As the nose falls away from the remainder of the fuselage, the pins 90 are thus drawn free, permitting the hatch to spring open.

The parachute pack is also held closed by pins 102 which when withdrawn permit the pack to open and the parachute to emerge and open under the influence of the airstream to which it is exposed by reason of the previous detachment of the hatch. Pins 102 are also withdrawn by means of a squib gun generally designated 72 and which may be similar in construction and arrangement to the means employed to rotate the releasing means which frees the entire nose section as above described. The piston rod 72a of gun 72 is connected by lines 103 to the pins 102, as shown in Fig. 6, in such manner that when the gun is fired the pins are pulled free, allowing the pack to open and the chute to be pulled out and opened by the airstream.

The operating means for the squib guns 72, 74 is so arranged that the nose section is first released from the remainder of the fuselage. The hatch is thereby automatically freed, as previously described, and the gun 72 is thereafter fired to cause the parachute to open.

A predetermined time delay in separating the nose section 48 from the fuselage and in opening the parachute 50 is interposed by a clockwork timer 70 (Fig. 1). The clock mechanism is set by manual effort prior to launching the aircraft, and in due times releases of the nose section 48 and parachute 50 occur.

The manner in which these operations are sequentially performed is best shown diagrammatically in Fig. 1. The clockwork is provided with an arm 82 which operates switch contacts 83, 84, 85 to successively make contact between them at desired times. All contacts are open when the glider is in flight with the nose section latched in place, but upon reaching a predetermined altitude, in the course of descent, contact 83, which is connected to squib gun 74, is closed against contact 84, which is connected to the battery 105, the parts being so wired as shown, that a circuit is thus closed to the squibs 60, 61 by which the nose section is released in the manner previously described. Upon further movement of the arm, closure of contacts 84, 85 results in firing squib gun 72 and consequent opening of the parachute, which in turn controls the rate of descent of the nose section.

As best shown in Figs. 1 and 2; flexible electrical cable means may extend between the nose compartment and the remainder of the fuselage to provide connections between instruments which may comprise a part or all of the cargo. The portion of the cable located in the nose section is designated 107, that in the fuselage 108. Cable 107 extends through the hollow interior of the locking cylinder 23 (Fig. 7) and carries at its end a friction plug receptacle 109. A complementary plug coupling 110 is attached to the end of cable 108. Receptacle 109 is held within cylinder 23 by setscrews 109a which prevent relative movement between 109 and 23. Coupling 110 is mounted in a cavity in a plate 112 to which the coupling is secured by at least one setscrew 112a. The plate 112 is free to turn against the face of the socket 18 with which it contacts as when unlatching motion is imparted to cylinder 23. Upon arrival of the time of release of the nose section 48 as hereinbefore described, parts 109, 110 and 112 turn as a unit with the cylinders 23 by action of the link 49. Then as the springs 30 (Fig. 7) retract cylinders 23 from their sockets 18 the two parts 109, 110 of the connectors become separated and thereby break the circuits represented by the cable 107, 108.

Means are also provided to cushion the landing of the nose, in order to protect the relatively delicate instruments which may be carried thereby, from the jar that occurs upon landing in spite of the presence of the parachute. Four shock absorbing elements are provided, one carried by and slidable in each of the tubular members 4, 5, 6 and 7. Since they are identical, description of one of the shock absorbing elements will suffice. Slidable in each of the tubes 4, 5, 6 and 7 is an inner cylindrical member 35 having its upper end closed by threaded plug 36 and at its lower end provided with an integral collar 37 which is radially bored at four equally spaced points as shown at 88, Fig. 19 to receive slidable pins 38. A vertical slot 89 intersects each bore to form a passage for the travel of a cross pin 39 pressed in each pin 38 and projecting upwardly through the slot and above the collar.

Four longitudinally extending flat springs 40 have their lower ends disposed between the cylindrical member 35 and the projecting pins 39 and urge pins 38 outwardly. The upper ends of springs 40 are retained by a collar 41 fixed to cylinder 35 by suitable set screws. Cylindrical member 35 is urged downwardly by the surrounding spring 42 which presses against the collar 41 at its lower end and reacts against the plug 43 pinned in the upper end of the tubular member 4.

Slidably mounted in cylinder 35 is a solid piston 45, the enlarged head 45a of which closely engages the inner wall of the cylinder. When the parts are in the retracted positioning which they occupy during flight, the piston is locked to the cylinder by the pins 38 which are held inwardly and at such time project into an annular groove 46 in the piston portion 45b (Fig. 13).

A flat disc or pad 48' preferably of steel, is mounted upon the lower end of the integral piston rod 45' as by means of the screw 47. The space within the cylinder 35 above the piston is packed with cup grease prior to use and the plug 36 is replaced. A series of holes 115 drilled in the cylinder 35 and spirally spaced permit extrusion of the grease upon movement of the piston 45 in an upward direction to produce the shock absorber action. The diameter, number and spacing of holes to satisfactorily decelerate the load within the mechanical strength of the landing gear may easily be calculated. A paper wrapping, fragmentarily shown at 35b, covers the holes 115 to prevent loss of the grease by plastic flow prior to operation of the gear. The paper is punctured by the grease driven out through the holes on the first impact, hence the paper adds little or no resistance.

Figs. 14, 15 and 23 show the positioning of the parts after the nose assembly has been freed from the remainder of the fuselage. At such time the piston and piston rod assembly together with cylinder 35 have been moved downwardly as a unit, projecting rods 45' and the pads 48 carried thereby under the influence of springs 42, pins 38 are then projected by springs 40, and extend into internal slot 16a in collar 16, locking the cylinder 35 in its lowered position with respect to the tubular member 4. In entering the groove 16a the pins 38 are disengaged from the groove 46 to unlock the piston 45 from the cylinder 35.

It will be seen that during normal flight of the glider, with the nose assembly latched to the remainder of the fuselage and the landing pads and connected portions retracted, the pads 48 lie flat against the plates 2, 3 and the bulkhead 29, the parts being retained in their retracted position and the spring 42 compressed by the latching means which retains the nose assembly in position. As soon as the nose assembly is detached, however, the cylinder and piston assemblies, together with their pads, are projected and then occupy the positioning shown in Figs. 14, 15 and 23.

The impact of landing forces the cylinders downwardly over the piston 45, extruding the grease through the orifices and into the space between the cylinders 35 and their surrounding tubular frame members 4, 5, 6 and 7. The characteristics of the grease and the sizes of the orifices are so selected that a desired cushioning effect is obtained. The spacing of the orifices may, of course, also be varied so that the downward motion is gradually arrested.

The invention herein described may be manufactured and used by or for the Government of the United States of America for governmental purposes without payment of any royalties thereon or therefor.

We claim:

1. In an aircraft construction, a fuselage assembly comprising an instrument carrying section and a main wing-carrying section, releasable holding means normally holding said sections together during flight, delayed-action means for releasing said holding means, parachute means for controlling the descent of said instrument-carrying section, extensible shock-absorbing landing gear carried by said instrument-carrying section, means normally maintaining said landing gear in retracted position while said sections are held to one another, and means responsive to release of said sections for extending said gear to operative position.

2. Means set forth in claim 1 in which said instrument-carrying section includes a frame, sheathing substantially enclosing said frame, sheathing enclosing said main wing-carrying section and mating with the first-mentioned sheathing to form a complete fuselage when said sections are held together, said landing gear being extensible from a portion of the instrument-carrying section which lies against the main wing-carrying section when the sections are held together.

3. Means as set forth in claim 1 in which said instrument-carrying section includes a frame, sheathing enclosing the frame, parachute means attached to said frame and housed beside the same within said sheathing, a hatch in said sheathing appurtenant said parachute and through which the parachute may emerge, and static means loosely coupled to the hatch but connected to the wing-carrying section, for freeing the hatch to enable the parachute to debouch.

4. Means as set forth in claim 1 in which said instrument-carrying section includes a frame, sheathing enclosing the frame, parachute means attached to said frame and also housed within said sheathing, hatch means in said sheathing appurtenant the parachute and through which the parachute may emerge, means operable upon detachment of the instrument carrying section from the wing-carrying section to free said hatch and enable said parachute to debouch subsequent to release of said holding means for the sections.

5. In an aircraft construction, a fuselage assembly comprising a nose section and a wing-carrying section, each including sheathing portions adapted to be juxtaposed to form complementary parts of the fuselage assembly, releasable holding means normally securing said sections together, a frame within said nose section, means for releasing said holding means, and means for controlling descent of said frame when said sections are released, comprising a parachute and shock-absorbing landing gear both attached to said frame.

6. In an aircraft construction, a fuselage assembly comprising a nose section and a wing-carrying section, each including sheathing portions adapted to be juxtaposed to form complementary parts of the fuselage assembly, releasable holding means normally securing said sections together, a frame within said nose section including a plurality of tubular members, means for releasing said holding means, and means for controlling descent of said frame when said sections are released, including a parachute and shock-absorbing landing gear comprising telescoping elements slidable in said tubular members.

7. Shock-absorbing means for a landing gear or the like, comprising a cylinder having metering orifices therein, a piston slidable into said cylinder from an initial pulled out position, a quantity of relatively viscous fluid in said cylinder and ejectable through said orifices when the piston is forced into the cylinder, impact means projecting from the cylinder and connected to the piston, a tubular housing enclosing the said piston and cylinder, means for locking the cylinder and piston against movement with relation to one another while permitting sliding movement of the piston and cylinder as a unit in said tubular housing to cause said impact means to project to a desired degree.

8. In combination with means as set forth in claim 7, means for locking the cylinder to said tubular housing while freeing the piston for inward movement with respect to the cylinder as a result of engagement of said impact means with the ground.

9. An aircraft fuselage comprising a main wing-carrying portion, a portion separable from said wing-carrying portion, releasable holding means for maintaining said portions together during flight, parachute means carried by the separable portion for controlling the rate of descent thereof after separation of said portion from the wing-carrying portion, encasing means normally holding the parachute means in folded condition, and means including a source of electric current and sequentially operable electric switching means for successively releasing said two holding means.

10. An aircraft fuselage comprising a main wing-carrying portion, a portion separable from said wing-carrying portion, releasable latching means for maintaining said portions together during flight, time-responsive means for operating said latching means to released position, parachute means carried by the separable portion, releasable enclosure means for retaining the parachute means within the separable portion, and means responsive to separation of said separable portion from the wing-carrying portion for releasing said enclosure means.

11. An aircraft fuselage comprising a main wing-carrying portion, a portion separable from said wing-carrying portion, releasable latching means for maintaining said portions together during flight, time-responsive means for operating said latching means to released position, parachute means carried by the separable portion for controlling the rate of descent thereof after separation of said portion from the wing-carrying portion, said parachute means normally being housed within said separable portion, a hatch in said separable portion adapted to be opened to permit the parachute to debouch, means responsive to separation of the separable portion from the wing-carrying portion for freeing the hatch, and time-responsive means operative for releasing the parachute after said hatch has been freed.

12. An aircraft fuselage comprising a main wing-carrying portion, a portion separable from said wing-carrying portion, releasable latching means for maintaining said portions together during flight, encased parachute means carried by the separable portion for controlling the rate of descent thereof after separation of said portion from the wing-carrying portion, means for housing said parachute means within said separable portion when the fuselage is in flight, a hatch in said separable portion affording access to said housing means and adapted to be opened to permit the parachute means to debouch, means for freeing the hatch upon separation of said separable portion from the wing-carrying portion, and time-responsive means for sequentially operating said latching means to released position and for releasing the encasement of the parachute after its debouchment.

HOWARD S. BEAN.
FRANCIS C. MOREY.

REFERENCES CITED

The following references are of record in the file of this patent:

UNITED STATES PATENTS

| Number | Name | Date |
| --- | --- | --- |
| 603,689 | Hill | May 10, 1898 |
| 1,251,896 | Krogel | Jan. 1, 1918 |
| 1,895,256 | Love | Jan. 24, 1933 |
| 1,920,507 | Holloway | Aug. 1, 1933 |
| 2,077,910 | Thomson | Apr. 20, 1937 |
| 2,087,458 | Tofflemire | July 20, 1937 |
| 2,426,585 | Bean | Sept. 2, 1947 |

FOREIGN PATENTS

| Number | Country | Date |
| --- | --- | --- |
| 371,893 | Germany | Mar. 22, 1923 |
| 601,304 | France | Nov. 28, 1925 |